2 Sheets—Sheet 1.

A. E. JEROME.
Grain-Drill.

No. 26,110.

Patented Nov 15, 1859.

A. E. JEROME.
Grain-Drill.

No. 26,110

2 Sheets—Sheet 2.

Patented Nov 15. 1859.

UNITED STATES PATENT OFFICE.

ARTHUR E. JEROME, OF MONROEVILLE, OHIO.

IMPROVEMENT IN SEEDING-HARROWS.

Specification forming part of Letters Patent No. 26,110, dated November 15, 1859.

*To all whom it may concern:*

Be it known that I, ARTHUR E. JEROME, of Monroeville, in the county of Huron and State of Ohio, have invented a new and useful Improvement in Rotary Harrows; and I do hereby declare that the following is a full, clear, and exact description of the same, reference being had to the accompanying drawings, forming a part of this specification, in which—

Figure 1:
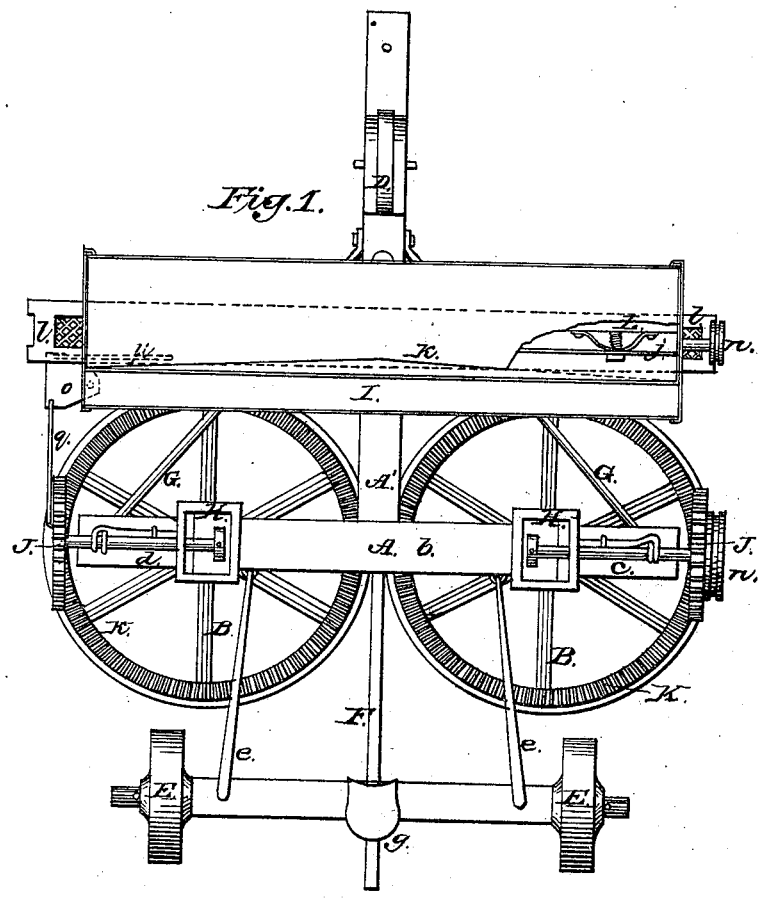
Figure 2:
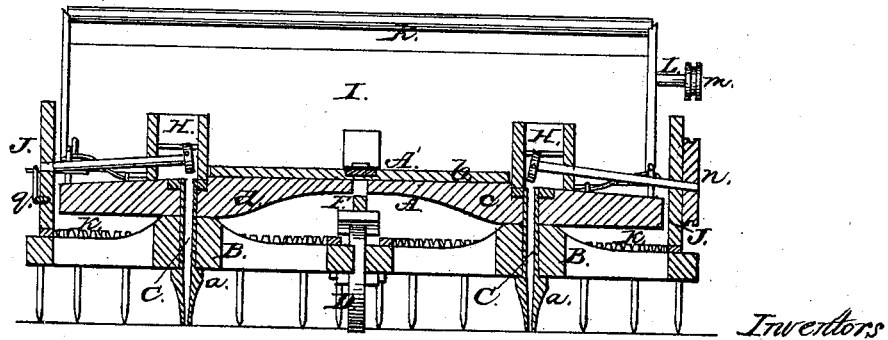
Figure 2:
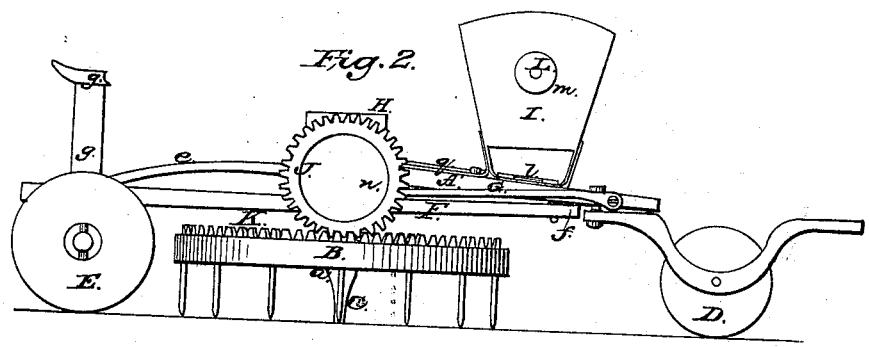
Figure 4:
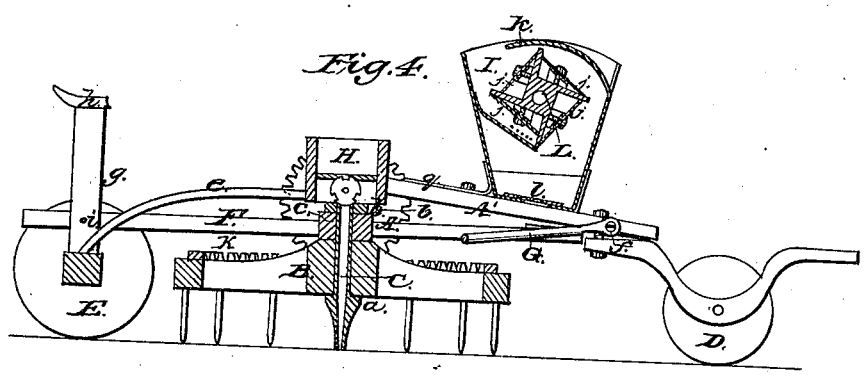

Figure 1 is a plan or top view of a rotary harrow with my improvements. Fig. 2 is a side elevation, Fig. 3 a vertical transverse section, and Fig. 4 a vertical longitudinal section, of the same.

The nature of my invention consists, first, in making the axes on which the harrows rotate hollow and in the form of a drill-tooth; second, in combining a corn-planter or a broadcast-sower with the harrows, substantially in the manner hereinafter described.

To enable others skilled in the art to make and use my invention, I will proceed to describe its construction and operation.

A represents a transverse beam, to which two rotary harrows, B B, are attached.

C C are the hollow drill-tooth-shaped axes on which the harrows revolve. These axes are fitted fast in the beam A, and have each a shoulder or bearing, *a*, for the harrows to rest upon in their revolutions. The beam A is made in three parts, *b c d*, so that it may be lengthened or shortened when it is desired to move the harrows farther apart or nearer together.

D and E E represent three wheels for supporting the whole machine. The wheel D acts as a propelling and steering wheel, its bearing being pivoted to the longitudinal beam A' of the harrow. The hind wheels are connected to the transverse beam A by means of hinged rods *e e*, so that the whole machine, excepting the steering-wheel and the hind propelling-wheel, can be raised off the ground when desirable, this adjustment being effected by means of a spring-lever, F, which is attached to the front end of the longitudinal beam of the harrows, as indicated at *f*, and arranged to rise up and down in a slotted standard, *g*, said standard being provided with adjusting-holes and a stop-pin, and also with a seat for driving, as indicated at *h i*.

G G are hounds for bracing the transverse and longitudinal beams of the harrows.

H H are hoppers with corn-dropping devices, and I another hopper with broadcast-sowing devices. The corn-hoppers H and their dropping devices are of ordinary construction, and are arranged over the hollow axes of the harrows, as shown, so as to communicate with the passages in the same and deposit seed into furrows formed by their lower or drill-tooth end. The motion to the circular distributing devices of the corn-hoppers is obtained from toothed wheels J J, which gear into the teeth K K, formed on the top of the harrows, as illustrated in the drawings, said wheels being set in motion by the harrows, which revolve by reason of their teeth coming in contact with the soil. The broadcast-hopper I is provided with a revolving cylinder, L, which has adjustable plates *j j* for regulating the amount discharged at a time, also a guard, *k*, and a separating-sieve, *l*. The distributing-cylinder L is furnished with a pulley, *m*, on its outer end, and from this pulley a band is to pass to a pulley, *n*, on one of cog-wheels J. By this arrangement a rotary motion is imparted to the broadcast distributing-cylinder when the harrows are revolving. The separating-sieve *l* has a vibrating motion imparted to it by means of an angular or elbow lever, *o*, and rods *p q*, which are arranged as represented, the lever *o* being pivoted at the bottom of the hopper intermediate between the rods *p q*, which are attached respectively as follows: the rod *p* to the sieve and the rod *q* eccentrically to one of the cog-wheels J.

With my machine the ground is prepared for corn and fine seed, the corn and seed planted and sown, and all left in a proper condition for perfect germination.

If desirable, the broadcast-sower or corn-planter may be used separately on the horrows, instead of together, as described and shown.

What I claim as my invention, and desire to secure by Letters Patent, is—

1. Making the axes on which the harrows rotate hollow and in the form of a drill-tooth, substantially as and for the purposes set forth.

2. Combining a corn-planter or a broadcast-sower with the harrows, substantially as and for the purposes set forth.

ARTHUR E. JEROME.

Witnesses:
H. T. BISSELL,
ALEX. H. NEWOMB.